(12) United States Patent
Kuo

(10) Patent No.: US 6,338,002 B1
(45) Date of Patent: Jan. 8, 2002

(54) INTERNET INLINE CONTROL APPARATUS FOR KNITTING MACHINE

(75) Inventor: Chi-Ming Kuo, Taipei Hsien (TW)

(73) Assignee: Pai Lung Machinery Mill Co., Ltd., Taipei Hsien (TW)

(*) Notice: Subject to any disclaimer, the term of this patent is extended or adjusted under 35 U.S.C. 154(b) by 0 days.

(21) Appl. No.: 09/767,915

(22) Filed: Jan. 24, 2001

(51) Int. Cl.[7] .............................................. G06F 17/60
(52) U.S. Cl. ........................ 700/141; 700/143; 714/31; 714/46; 66/232
(58) Field of Search ................................ 700/141, 130, 700/138, 143, 144; 340/825.06, 825.07, 825.16; 112/470.01, 470.04, 155; 66/238, 232, 231; 714/25, 31, 38, 39, 46; 713/154

(56) References Cited

U.S. PATENT DOCUMENTS 5,909,493 A * 6/1999 Motoyama ................. 713/154
6,065,136 A * 5/2000 Kuwabara .................. 714/46
6,119,611 A * 9/2000 Tomita .................. 700/138 X
6,135,038 A * 10/2000 Okamoto ............... 700/138 X
6,196,146 B1 * 3/2001 Goldberg et al. ...... 112/470.04
6,216,618 B1 * 4/2001 Goldberg et al. ....... 700/138 X

* cited by examiner

Primary Examiner—Peter Nerbun
(74) Attorney, Agent, or Firm—Bacon & Thomas

(57) ABSTRACT

An Internet inline control apparatus for knitting machines includes a producer computer processor, a user computer processor linked to the producer computer processor, an intelligent communication unit linked to the user computer processor, a human machine interface linked to the intelligent communication unit, a control unit linked to the intelligent communication unit and a peripheral device linked to the control unit. Through the apparatus, the knitting machine producer is able to monitor and directly adjust knitting machines installed at remotely located user sites through the Internet.

9 Claims, 2 Drawing Sheets

INTERNET INLINE CONTROL APPARATUS FOR KNITTING MACHINE

BACKGROUND OF THE INVENTION

This invention relates to an inline control apparatus that employs the Internet to control knitting machines and particularly a control apparatus that uses the Internet to monitor knitting machines utilization status at user sites and perform remote control functions.

Conventionally, knitting machine manufacturers produce knitting machines and ship to customers or users for on-site installation. Users are responsible for knitting machine operation to fabricate fabrics or other desired products. Users generally also take care of routine machine maintenance and troubleshooting. However, when there is a serious machine malfunction or breakdown, producers will be requested to dispatch skilled and experienced people for doing on-site repairs and maintenance to minimize users' interruption of the operation. When the machines are installed at remote locations or overseas, on-site visits of the producer could become difficult to arrange or be delayed due to travel and transportation problems. This could cause a prolonged machine outage and result in great loss to the users.

In order to remedy this problem, some knitting machine manufacturers have used the Internet to link the users at remote locations to get machine operation status, and to advise users regarding maintenance and adjustment issues. On-site visit for repairs and maintenance will be arranged only at critical and necessary conditions. Although this approach may resolve many communication problems between the manufacturers and users, it still cannot directly control or adjust the knitting machines through the Internet. Users have to do most of the repairs and adjustment work under the direction of manufacturers.

Moreover, the Internet linked knitting machines and peripheral devices have specific station identification numbers (ID numbers). In the event of a peripheral device malfunction or disorder, the peripheral devices connected to other stations cannot be switched for backup operation due to control software not being functional to recognize a different ID number. This could result in prolonged machine outage and cause serious damage to the users.

SUMMARY OF THE INVENTION

It is therefore an object of this invention to provide an Internet inline control method for knitting manufacturers to directly monitor and adjust the user's knitting machines and peripheral devices installed at remote locations so that user's problems may be fixed rapidly, and the peripheral devices installed at every station may be mutually backed up or interchanged to effectively resolve the machine malfunction or outage problems.

In order to achieve the aforesaid object, the Internet inline control apparatus of this invention includes a producer computer processor, a user computer processor, an intelligent communication unit, a human machine interface, a control unit and peripheral devices. Through the Internet, this apparatus enables the producer to monitor and directly adjust knitting machines installed at the remote locations of the user site.

BRIEF DESCRIPTION OF THE DRAWINGS

The invention, as well as its many advantages, may be further understood by the following detailed description and drawings.

DESCRIPTION OF THE PREFERRED EMBODIMENTS

Figure 1:
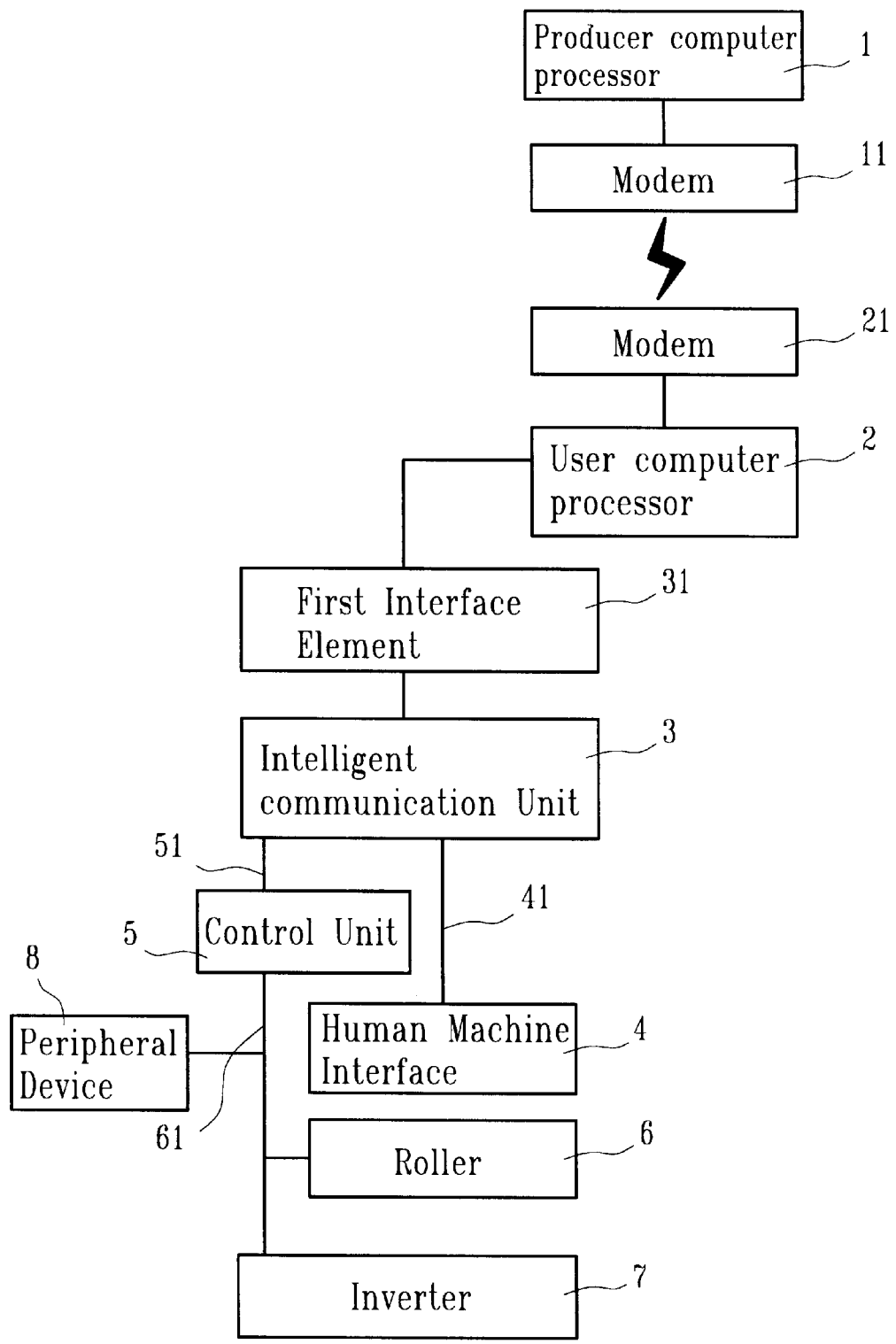
FIG. 1 is a process flow of an embodiment of this invention.

Referring to FIG. 1 for an embodiment of this invention, the Internet inline control apparatus according to this invention includes a producer computer processor 1, a user computer processor 2 linked to the producer computer processor 1 through the Internet, an intelligent communication unit 3 (ICB900, 901), a human machine interface 4 linked to the intelligent communication unit 3, a control unit (PLC) 5, a roller 6 and an inverter 7 and other knitting machine peripheral devices 8 linked to the control unit 5. The apparatus uses a Recommended Standard-485/232 (RS-485/RS-232) converter as a communication interface to link to the Internet so that the knitting machine producer may monitor utilization status of the knitting machines and perform remote control and the desired adjustment.

The producer computer processor 1 is the computer processor used by the knitting machine producer, and may be a desk top computer, a notebook computer, a handheld computer, or the like. The producer computer processor 1 is installed at the office or plant of the knitting machine producer and links to the Internet through a modem 11.

The user computer processor 2 is the computer processor used by the knitting machine user, and may be a desk top computer, a notebook computer, a handheld computer, or the like. The user computer processor 2 is installed at the plant of the user site where the knitting machines are installed and links to the Internet through a modem 21 for communicating with the producer computer processor 1 for remote control purposes.

The intelligent communication unit 3 uses a first interface element 31 formed by the RS-485/RS-232 converter to link to the user computer processor 2 for serving as a data communications control center for the computer processor 2 and its peripheral devices. The intelligent communication unit 3 includes a setting unit (not shown in the figure) which has finger activating switches for setting station identification numbers of the producer or user thereby enabling the computer processor 1 and 2 to monitor the operation status of every unit.

The human machine interface 4 uses a second interface element 41 formed by the RS-485/RS-232 converter to link to the intelligent communication unit 3. Operation instructions may be entered at the face panel of the human machine interface 4 and transmitted through the intelligent communication unit 3 to every connecting unit to perform the desired function.

The control unit 5 is a procedure language control (PLC) software which links to the intelligent communication unit 3 through a third interface element 51 formed by the RS-485/RS-232 converter. The control unit 5 receives the instructions transferred from the intelligent communication unit 3 and controls the operation of every unit connected to the control unit 5, or transmits the operational status of every unit to the computer processor 1 or 2 through the intelligent communication unit 3 so that the producer or user will be informed of the operational status of every unit.

The roller 6 is a roller used in the knitting machine and links to the control unit 5 through a fourth interface element 61 formed by the RS-485/RS-232 converter to receive control of the control unit 5, or transmit operational status to the control unit 5.

The Inverter 7 is an inversion unit of the knitting machine which uses a fourth interface element 61 formed by the RS-485/RS-232 to link to the control unit 5 for receiving control therefrom or transmitting operational status to the control unit 5.

The peripheral devices 8 of the knitting machine include but are not limited to, oil injectors, driving motors of the knitting machines, signal detectors, or the like. They also link to the control unit 5 through the fourth interface element 61 for receiving control therefrom or transmitting operational status to the control unit 5.

When in use, users enter instructions through the human machine interface 4, the intelligent communication unit 3 receives the instructions and issues commands to the control unit 5 which in turn controls the operation of the roller 6 and inverter 7 and the other peripheral devices 8. The operation and control status of the roller 6 and inverter 7 and other peripheral devices 8 will also be transmitted through the control unit 5 to the intelligent communication unit 3 and to the user computer processor 2 for displaying information on the display screen.

When the producer wants to know the utilization status of the knitting machines at user sites, the producer may access the Internet through the producer computer processor I and modem 1 and link to the user computer processor 2 for getting the operation and control status. In the event that machine malfunction or disorder happens, the producer may issue commands directly from the computer processor 1 to adjust or correct the knitting machines to a desired condition.

For instance, if the producer detects that the motor rotation speed of the user's knitting machine is wrong, the producer may issue adjustment or correction commands directly from the producer's own computer processor 1 and transmit the commands through the intelligent communication unit 3 to the control unit 5 for making the necessary correction or adjustment of the motor rotation speed in the inverter 7.

In the event that the user's knitting machines have operational problems, a user may log onto the Internet through the user computer processor 2 and modem 21, and transmit the problem related data to the producer. The producer may figure out the solution and inform the user through the Internet for the user to fix the problems. Hence problem reporting and resolution cycle may be greatly shortened thereby to reduce machine down time. This approach may be adapted to users located in the country or abroad equally well.

Figure 2:
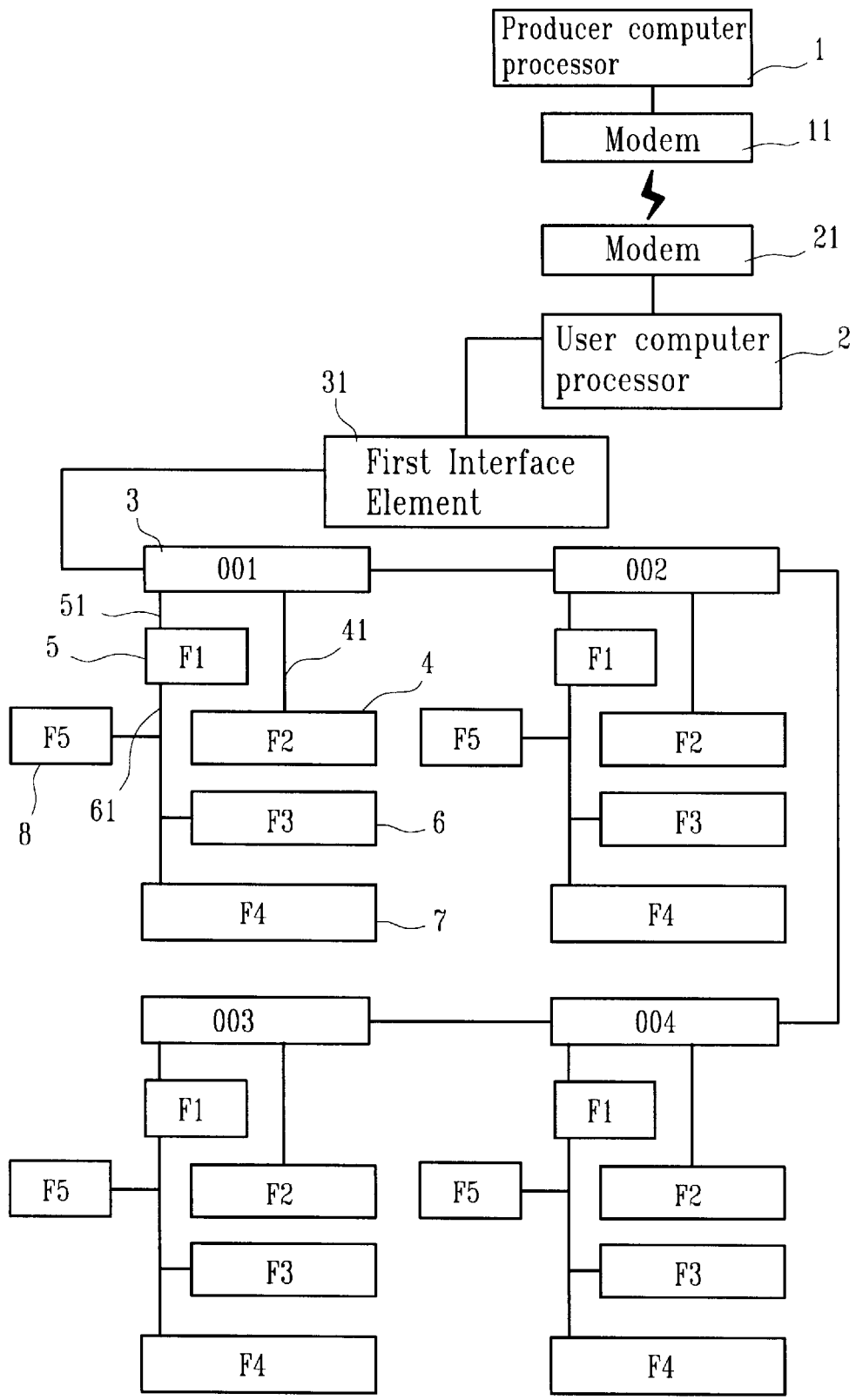
FIG. 2 is a process flow of another embodiment of this invention.

Referring to FIG. 2 for another embodiment of this invention which includes a plurality of intelligent communication units 3. Each intelligent communication unit 3 has an assigned station identification number (ID number) such as 001, 002, 003, 004 or the like. The devices at each station have an assigned serial number (SR number), such as the control unit 5 has an SR number F1, the human machine interface 4 has an SR number F2, the roller 6 has an SR number F3, the Inverter 7 has an SR number F4, peripheral device 8 has an SR number F5, and the like.

Once all the ID and SR numbers are assigned and inputted into the computer, the user or producer can enter the ID or SR number to get the machine operation status. For instance, upon entering ID 001 and SR F , the operation status of knitting machine 001 and control unit F1 will be shown on the screen of the computer processor 1 or 2. Hence the producer or user can take prompt action to adjust or correct any abnormal condition.

Furthermore, since the serial number assignment for each unit at every station is the same, in the event that station 002, 003 or 004 is not being used, and the control unit F1 at the station 001 is malfunctioning or broken down, the F1 unit at the station 002 (or 003, 004) may be disconnected to replace the damaged F1 unit at the 001 station for backup operation, while the damaged F1 unit of the station 001 may be removed for repair. As a result, machine down time may be minimized. Such mutual backup function and capability can greatly improve productivity.

In addition, to enable the producer to control and adjust machines installed at user sites, this invention also enables users to control the knitting machine operation installed at remote sites. As a result, it can resolve numerous problems and inconveniences that might otherwise happen to the producers and users.

What is claimed is:

1. An Internet inline control apparatus for a knitting machine, comprising:

a first computer processor;

a second computer processor linked remotely to the first computer processor through the Internet;

at least one intelligent communication unit linked to the second computer processor through a first interface element to serve as a data communication center for the first and second computer processor;

at least one human machine interface linked to the intelligent communication unit through a second interface element for entering instructions;

at least one control unit linked to the intelligent communication unit through a third interface element; and at least one peripheral device linked to the control unit through a fourth interface element;

wherein said at least one intelligent communication unit further serves as the data communication center for said at least one human machine interface, said at least one control unit and said at least one peripheral device; and wherein the apparatus enables a knitting machine producer to monitor utilization status of the knitting machine for remote control and adjustment through the Internet.

2. The Internet inline control apparatus of claim 1, wherein the first computer processor is a computer processor for the producer.

3. The Internet inline control apparatus of claim 1, wherein the second computer processor is a computer processor for a user.

4. The Internet inline control apparatus of claim 1, wherein the first, second, third and fourth interface elements are formed by an RS-485/RS-232 converter.

5. The Internet inline control apparatus of claim 1, wherein the first and second computer processor respectively link to a modem for linking to the Internet or another computer processor.

6. The Internet inline control apparatus of claim 1, wherein the intelligent communication unit has a setting unit for assigning a workstation identification number.

7. The Internet inline control apparatus of claim 6, wherein the setting unit is a finger activating switch.

8. The Internet inline control apparatus of claim 1, wherein the peripheral device is a roller, an inverter, an oil injector, a driving motor of the knitting machine, or a signal detector.

9. The Internet inline control apparatus of claim 1, wherein a unit of the same type has the same serial number for mutual replacement use.

* * * * *